US011671100B2

(12) United States Patent
Bhunia et al.

(10) Patent No.: US 11,671,100 B2
(45) Date of Patent: Jun. 6, 2023

(54) MEMORY IN LOGIC PHYSICAL UNCLONABLE FUNCTION

(71) Applicant: University of Florida Research Foundation, Incorporated, Gainesville, FL (US)

(72) Inventors: Swarup Bhunia, Gainesville, FL (US); Christopher Vega, Gainesville, FL (US); Shubhra Deb Paul, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 17/465,958

(22) Filed: Sep. 3, 2021

(65) Prior Publication Data

US 2022/0077858 A1    Mar. 10, 2022

Related U.S. Application Data

(60) Provisional application No. 63/075,385, filed on Sep. 8, 2020.

(51) Int. Cl.
*H03K 19/1776* (2020.01)
*H04L 9/08* (2006.01)
*H03K 19/173* (2006.01)
*H03K 19/17728* (2020.01)

(52) U.S. Cl.
CPC ..... *H03K 19/1776* (2013.01); *H03K 19/1737* (2013.01); *H03K 19/17728* (2013.01); *H04L 9/0866* (2013.01)

(58) Field of Classification Search
None
See application file for complete search history.

(56) References Cited

U.S. PATENT DOCUMENTS 10,439,613 B2* 10/2019 Karpinskyy .......... H04L 9/0866
2021/0250188 A1* 8/2021 Schat ............... H03K 19/00384

OTHER PUBLICATIONS

Mills, Aaron, "Design and evaluation of a delay-based FPGA physically unclonable function", Graduate Thesis, 2012, 49 pages. (Year: 2012).*

* cited by examiner

*Primary Examiner* — Jany Richardson
(74) *Attorney, Agent, or Firm* — Alston & Bird LLP

(57) ABSTRACT

Methods and systems are directed to creating a physical unclonable function (PUF) on a Field Programmable Gate Array (FPGA) and generating a unique signature for a device. The method includes, in part, designing a PUF by taking advantages of programmable logic elements on the FPGA, and extracting uninitialized values associated with one or more storage elements comprised in the PUF when the FPGA is powered up. The extracted uninitialized values can be combined to generate the unique signature for the device. The one or more storage elements can be bi-stable memory cells that are mapped to look up tables (LUTs) on the FPGA. The coordinates of these LUTs can be determined based on hamming distance analysis. Alternatively, the one or more storage elements can be memory cells associated with boundary scan cells of a boundary scan chain.

18 Claims, 15 Drawing Sheets

MEMORY IN LOGIC PHYSICAL UNCLONABLE FUNCTION

CROSS-REFERENCE TO RELATED APPLICATION

The present application claims benefit under 35 USC 119(e) of U.S. Application Ser. No. 63/075,385, filed Sep. 8, 2020, which is incorporated herein by reference in its entirety.

GOVERNMENT SUPPORT

This invention was made with government support under 1662976 awarded by the National Science Foundation. The government has certain rights in the invention.

TECHNICAL FIELD

The present application relates to generation of a digital fingerprint for a device, and more specifically to generation of a unique signature for a device based on a physical unclonable function.

BACKGROUND

As physical hardware attacks become less expensive, less difficult, and more frequent, the demand for hardware security measures increases further. While 20 years ago, hardware security measures may have only been seen on specific devices, such as those used for banking, basic security primitives are becoming commonplace amongst a broader range of ICs. One such security primitive is a Physical Unclonable Function (PUF) that utilizes the intrinsic characteristics of a device to generate a unique digital fingerprint. Characteristics, such as the slight variations from the manufacturing process or the power-up state of an SRAM memory cell, can be used to generate a digital fingerprint unique to a single device.

Just as the need for further security on devices, such as microcontrollers and ASICs, increases so has security needs for Field Programmable Gate Arrays (FPGAs). An FPGA allows one to reconfigure device functionality and logic by reconfiguring the chip's programmable logic elements. Programmable logic is appealing as it allows one to be able to patch or reconfigure hardware after deployment. In turn, this brings down development and manufacturing cost. FPGAs are being used in a wide variety of applications where a higher level of security is required. One such example is their use on the F-35 fighter jet. As such, a need for security primitives has arisen on these devices. While one could implement a PUF as a separate element on the board which communicates with the FPGA, this gives rise to specific issues. Additional circuitry takes up silicone space on the board. It also cannot be reconfigured later on with the FPGA logic. Additionally, it is more vulnerable and noticeable to an attacker, making it a target for tampering.

One can implement a traditional PUF on an FPGA, but they come with large area overheads. One example is the ring oscillator PUF (RO PUF), which utilizes the delay caused by manufacturing variations to generate a signature. While this is effective, such designs take up a large amount of programmable device logic, making it unusable for devices with area constraints. In another implementation, the programmable elements in an FPGA are utilized to create a shift register, and the delays from the shift registers are then used to generate the signature for the PUF. While this takes up less space than an RO PUF, it is still somewhat costly if used for large signatures. There have also been some works which have successfully utilized the flip flop startup values. While this would utilize minimal area overhead, it requires extra configuration and can only be implemented on specific Xilinx boards.

SUMMARY

A method, in accordance with one embodiment of the present disclosure, includes, in part, programming an FPGA to form N back-to-back inverters each comprising a first inverter and a second inverter, wherein each of the back-to-back inverters is enabled to settle to a voltage level, representative of either a high logic level or a low logic level, during a power-up phase and without being driven by logic elements disposed in the FPGA, and combining the N logic levels to generate the signature.

In one embodiment, the method further includes, in part, programming the FPGA to form first and second groups of N multiplexers, wherein each multiplexer in the first group is associated with and disposed between an output of the first inverter and an input of the second inverter of a different one of the N back-to-back inverters, wherein each multiplexer in the second group is associated with and disposed between an output of the second inverter and an input of the first inverter of a different one of the N back-to-back inverters, and wherein in response to a first value of a select signal, a loop is formed between each back-to-back inverter and its associated first and second multiplexers. In another embodiment, the FPGA is programmed to deliver a logic signal generated by a first logic element disposed in the FPGA via the first inverter to a second logic element disposed in the FPGA in response to a second value of the select signal.

In one embodiment, the method further includes, in part, programming the FPGA to store an output of each of the back-to-back inverters in a latch during the power-up phase.

In another embodiment, the method further includes, in part, programming the FPGA to extract an output of each of the back-to-back inverters via a boundary scan cell in a boundary scan chain during the power-up phase.

In one embodiment of the method, programming the FPGA to form each of the N back-to-back inverters includes, in part, programming the FPGA to form the first inverter of each of the N back-to-back inverters by mapping the first inverter to a first look up table (LUT), wherein the first LUT comprises a first multiplexer; programming the FPGA to form the second inverter of each of the N back-to-back inverters by mapping the second inverter to a second LUT, wherein the second LUT comprises a second multiplexer; and programming the FPGA to couple an output of the first multiplexer to a select input of the second multiplexer and to couple an output of the second multiplexer to a select input of the first multiplexer.

In accordance with one embodiment of the present invention, a programmable device includes, in part, N back-to-back inverters each comprising a first inverter and a second inverter. Each of the back-to-back inverters is configured to settle to a voltage level, representative of either a high logic level or a low logic level, during a power-up phase and without being driven by logic elements disposed in the programmable device. The programmable device further includes, in part, circuitry configured to combine the N logic levels to generate a signature.

In one embodiment, the programmable device further includes, in part, first and second groups of N multiplexers. Each multiplexer in the first group is associated with and disposed between an output of the first inverter and an input of the second inverter of a different one of the N back-to-back inverters, and each multiplexer in the second group is associated with and disposed between an output of the second inverter and an input of the first inverter of a different one of the N back-to-back inverters. In one embodiment, the programmable device is configured to, in response to a first value of a select signal, form a loop between each back-to-back inverter and its associated first and second multiplexers. In another embodiment, the programmable device is further configured to, in response to a second value of the select signal, deliver a logic signal generated by a first logic element disposed in the device to a second logic element disposed in the device via the first inverter.

In one embodiment, the programmable device further includes, in part, N latches each configured to store an output of a different one of the N back-to-back inverters during the power-up phase.

In another embodiment, the programmable device further includes, in part, N boundary scan cells in a boundary scan chain each configured to extract an output of a different one of the N back-to-back inverters during the power-up phase.

In one embodiment, the first inverter of each of the N back-to-back inverters on the programmable device comprises a first look up table (LUT), wherein the first LUT comprises a first multiplexer; and the second inverter of each of the N back-to-back inverters on the programmable device comprises a second LUT, wherein the second LUT comprises a second multiplexer. In one embodiment, the first and second LUTs are configured to couple an output of the first multiplexer to a select input of the second multiplexer and to couple an output of the second multiplexer to a select input of the first multiplexer.

In accordance with one embodiment of the present invention, a system includes, in part, a plurality of programmable devices. Each of the plurality of programmable devices comprises N back-to-back inverters each comprising a first inverter and a second inverter, wherein each of the back-to-back inverters is configured to settle to a voltage level, representative of either a high logic level or a low logic level, during a power-up phase and without being driven by logic elements disposed in the programmable device, and circuitry configured to combine the N logic levels to generate a signature. In one embodiment, the system further includes, in part, a circuit block configured to combine the signatures of the plurality of programmable devices to generate a system signature.

In accordance with one embodiment of the present invention, a method includes, in part, enabling an output of each of a first group of N registers to settle to a voltage level, representative of either a high logic level or a low logic level, during a power-up phase and without applying a clock signal to the registers; and combining the N logic levels to generate a signature.

In one embodiment, the method further includes, in part, storing the output of each of the first group of N registers in a different one of a second group of N registers. In one embodiment, each of the registers in the first group is coupled to another one of N registers of a second group via a different one of a plurality of multiplexers.

In one embodiment, a programmable device includes, in part, a first group of N registers each configured to settle to a voltage level, representative of either a high logic level or a low logic level, during a power-up phase and without receiving a clock signal; and a logic block configured to combine the N logic levels to generate a signature.

In one embodiment, the programmable device further includes, in part, a second group of N registers, wherein each register in the second group is configured to store the output of a different one of the N registers of the first group. In one embodiment, the programmable device further includes, in part, a plurality of multiplexers, wherein each of the registers in the first group is configured to couple to another one of the N registers in the second group via a different one of the plurality of multiplexers.

In one embodiment, a system comprises a plurality of programmable devices. Each of the plurality of programmable devices includes, in part, a first group of N registers each configured to settle to a voltage level, representative of either a high logic level or a low logic level, during a power-up phase and without receiving a clock signal, and a logic block configured to combine the N logic levels to generate a signature. In one embodiment, the system further comprises a circuit block configured to combine the signatures of the plurality of programmable devices to generate a system signature.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

Figure 1:
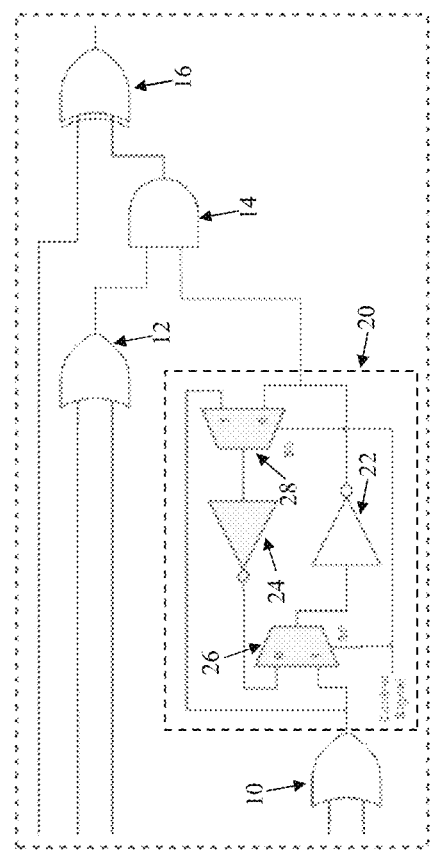
FIG. 1 is an exemplary implementation of a physical unclonable function (PUF), in accordance with some embodiments of the present disclosure.

In accordance with common practice, some features illustrated in the drawings cannot be drawn to scale. Accordingly, the dimensions of some features can be arbitrarily expanded or reduced for clarity. In addition, some of the drawings cannot depict all the components of a given system, method or device. Finally, like reference numerals can be used to denote like features throughout the specification and figures.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means including but not limited to and should be interpreted in the manner it is typically used in the patent context. The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment). If the specification describes something as "exemplary" or an "example," it should be understood that refers to a non-exclusive example; The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Such alterations, modifications, and improvements are intended to be part of this disclosure and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

As FPGA use continues to increase in devices and systems, the need for security measures increases as well. One such security measure is a physical unclonable function (PUF), which allows one to generate a unique signature that acts as a digital fingerprint for a device. However, current PUF implementation methods on an FPGA are costly in terms of area overhead for programmable logic space. Large overhead can cause constraints on the size of signatures one can generate using the PUF and the functional circuit's size. This, in turn, can lead to an increase in resources and production costs for complex systems.

Various embodiments of the disclosure generally relate to a system and method for creating a low area PUF that takes advantage of re-configurable logic elements (LEs) on an FPGA (Memory in Logic PUF: Mel PUF), which can be used to generate a unique signature that acts as a digital fingerprint for a device. More specifically, various embodiments of the present disclosure are related to using programmable logic elements (LEs) on an FPGA as a source of entropy. This entropy relies on modeling the logic for a memory cell to these LEs. When the FPGA board is powered up, each of these memory cells will contain an unknown value if left uninitialized. Various embodiments of the disclosure can sample multiple memory cells to obtain these values, and then combine the values into a unique key that serves as a digital fingerprint. As an example, these values can be concatenated to form the unique key.

By taking advantage of the memory elements already present on the FPGA board and utilizing the memory elements as a source of entropy, the generation of unique signatures on the FPGA can utilize a minimal amount of space.

FIG. 1 shows a PUF 20, in accordance with one embodiment of the present invention. PUF 20 is shown as including, in part, inverters 22, 24 and multiplexers (mux) 26, 28. During the power-up phase, the select input of muxes 26 and 28 is set to a low logic level thus causing input "0" of the muxes to be selected, thereby coupling the output of inverter 22 to the input of inverter 24, and the output of inverter 24 to the input of inverter 22. Accordingly, during the power-up phase, the loop formed by inverters 22, 24, and muxes 26, 28 causes the voltages at the output terminal of inverter 22 (or inverter 24) to settle either to a low value or a high value depending on processing and manufacturing variability which are statistical in nature and thus can vary randomly. Therefore, back-to-back inverters 22, 24, which form a bistable memory, generate, during the power-up phase, either a logic high or a logic low level used in forming a unique signature as described further below. During the normal mode of operation, the select input terminal of muxes 26, 28 is set to a high logic level thereby causing the output of exemplary OR gate 10 to be delivered to exemplary AND gate 14 via inverter 22.

Figure 2:
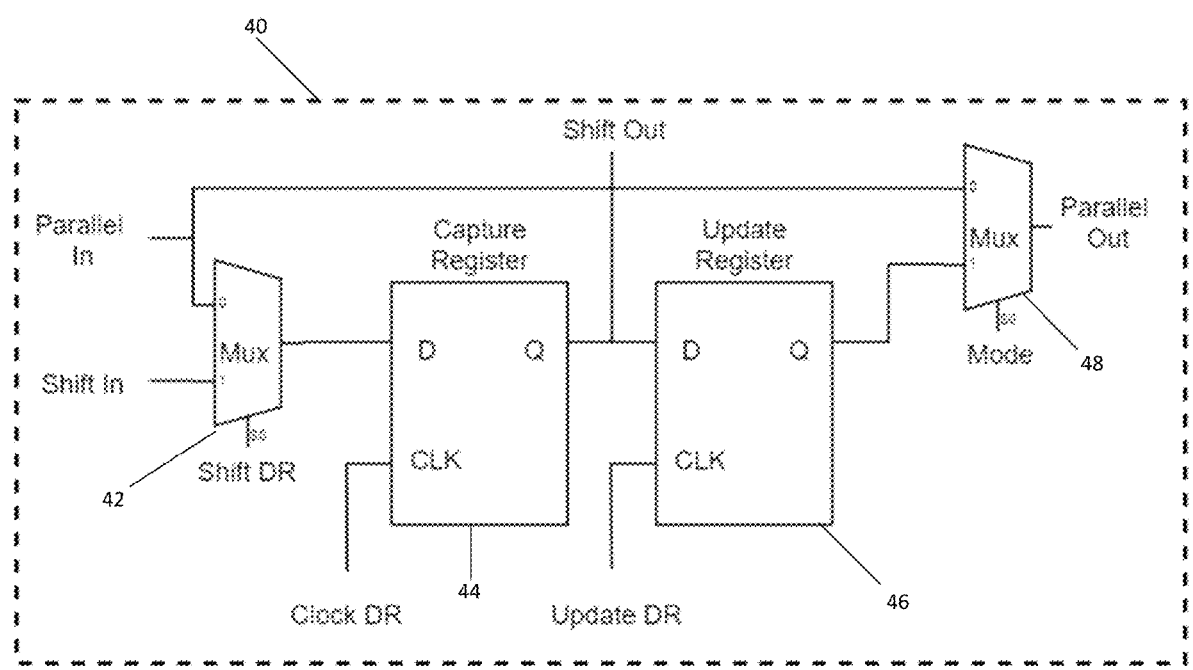
FIG. 2 is another exemplary implementation of a PUF, in accordance with some embodiments of the present disclosure.

FIG. 2 shows a boundary scan chain cell PUF 40, in accordance with another embodiment of the present invention. PUF 40 is shown as including, in part, capture register 44, update register 46, and muxes 42, 48. During a power-up phase, the voltage at output Q of capture register may initialize either to logic 0 or 1 as a result of statistical variations inherent in forming the register. Therefore, the output signal of the capture register is used in generating a unique signature, as described further below. Output data of capture register is delivered to mux 48 via update register 46 for further processing and readout. The "shift in" input of mux 42 is used to deliver the data from another capture register. Accordingly, the data from N such capture registers are serially shifted out and combined to form a signature. N may be, 8, 36, 64 or any other integer.

In some embodiments, PUF 40 may be a boundary scan chain cell, leading to a scan chain based signature generation similarly relying on the unknown start-up state of a memory cell. The boundary scan chain cells may contain a flip flop, latch, or SRAM cell as the memory element in their architecture. Example storage elements can be seen in FIG. 2 as the capture and update registers. These elements contain an unknown state present on start-up, which may be used to form a unique key. For example, an unknown state of the capture register (or an unknown value at the output of the capture register) may be used to form the unique pin. Typically, when attempting to shift data through a scan chain, one would need to go to the capture data register (DR) state before the shift DR state. Doing so would apply the value at parallel in and apply it to the capture register. This would overwrite any start-up value before shifting values. By modifying the TAP state machine, it can bypass the capture DR state and go straight to shift DR. One example modification of the TAP state machine is detailed in FIG. 13. Thenceforth, the start-up values can be shifted out through the scan chain and utilized as a signature. Shifted values will be presented serially on the TDO pin. The TDO is the output pin for all JTAG (Joint Test Action Group) functionality, including scan chain output.

In an exemplary embodiment, a PUF is embedded in a design by making use of look up tables (LUTs) as a source of entropy. In this exemplary embodiment, a hardware description language, such as VHDL, is used to model a memory cell, and specify that it should remain uninitialized on start-up. These uninitialized values allow embodiments of the disclosure to get a random state based on the unknown state of an LUT.

Figure 3:
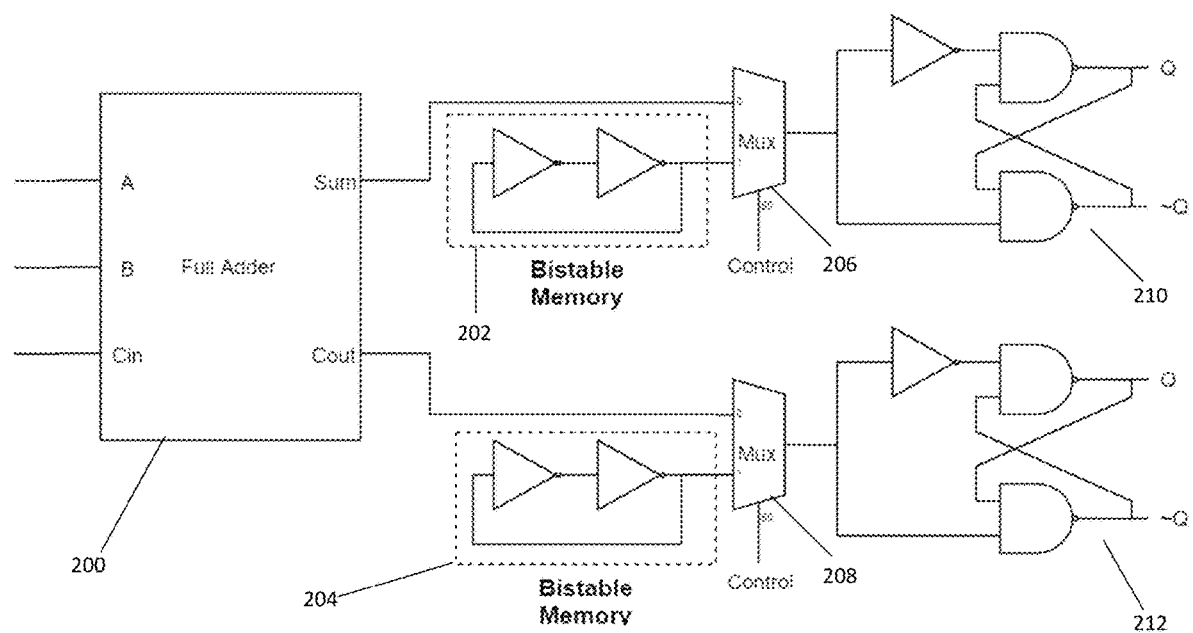
FIG. 3 is an exemplary circuit embedded with an exemplary PUF as bi-stable memory cells, in accordance with some embodiments of the present disclosure.

FIG. 3 shows an exemplary circuit embedded with an exemplary PUF as bi-stable memory cells. This exemplary embodiment comprises two bi-stable memory cells 202, 204, and the start-up state of each bi-stable memory cell can be locked into this circuit. The start-up state of one inverter in a bi-stable memory is driving the state of the other in the loop of the bi-stable memory. Once a state is set, it will not change unless new input is applied. Without a new input being applied, the generated signature will be maintained. As shown in the exemplary embodiment in FIG. 3, the bi-stable memory cells 202, 204 can then be embedded throughout a functional combination circuit, and the outputs of the bi-stable memory cells 202, 204 are connected to muxes 206, 208 respectively. Circuit functionality and PUF mode can be switched using the select input (i.e., a control signal) of muxes 206 and 208. As an example, in the exemplary embodiment in FIG. 3, when the select input of muxes 206 and 208 is set to a high logic level, input "1" of each mux is selected, thereby coupling the output of the bi-stable memory 202 to the output of mux 206, and the output of the bi-stable memory 204 to the output of mux 208. As the result, the PUF outputs of the bi-stable memory cells 202, 204 are stored in latches 210 and 212 respectively. When the select input of muxes 206 and 208 is set to a low logic level, input "0" of each mux is selected, thereby coupling the output of the full adder 200 to the output of muxes 206 and 208, allowing the output of the full adder 200 to be stored in the latches 210 and 212.

TERMINOLOGY

LE—Logic Elements
LAB—Logic Array Block
LUT—Look Up Table
PUF—Physical Unclonable Function
FPGA—Field Programmable Gate Array
SoC—System on Chip
IP—Intellectual Property
SRAM—Type of RAM where flip flops are used for storage
TDI—Test Data In
TDO—Test Data Out
TAP—Test Access Port, used for JTAG inputs, outputs, and control signals
DR—Data Register
IR—Instruction Register
Bi-stable—Having two stable states, 1 or 0
Flip Flop—Bi-stable circuit used for binary data storage
Entropy—Randomness sampled for use in cryptography Synthesis of a PUF can be constrained into either the datapath or control logic of a combinational design. This may be accomplished as illustrated by the following steps:
1. Judiciously selecting the gates where the feedback loop can be created and adding the feedback loop there such that embodiments of the invention create a cross-coupled inverter with special emphasis on making it symmetric.
2. Controlling the feedback loop by incorporating MUXes or other control logic in the feedback path and control signals.
3. By connecting the output of the cross-coupled inverter to the scan chain (or to primary outputs using muxes).

Figure 4:
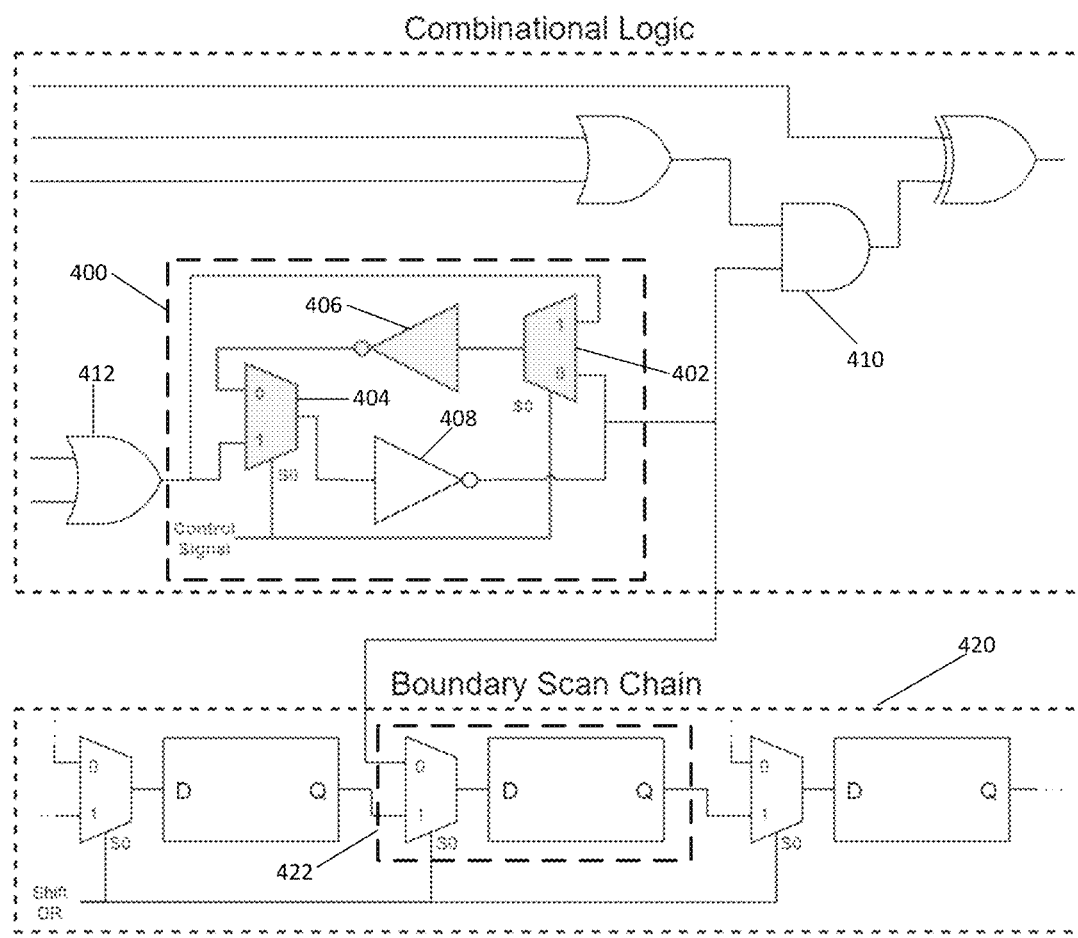
FIG. 4 is an exemplary circuit embedded with an exemplary memory in logic (MeL) PUF implementation, in accordance with some embodiments of the present disclosure.

FIG. 4 depicts, in part, an exemplary circuit that comprises an exemplary embedded MeL PUF 400. The MeL PUF circuitry is shown as including two control muxes 402 and 404, and an inverter 406. In this implementation, an inverter 408 is shown as having been placed at an input to exemplary AND gate 410. The output of the inverter is also shown as being connected to a boundary scan cell 422 disposed in a boundary scan chain 420, thus allowing the internal signal to be captured for debugging. The two control muxes 402 and 404 allow for the PUF signature to be captured on start up. Muxes 402 and 404 keep the signal length symmetrical and ensure that one inverter is not more biased that the other. When the select input (the control signal) of the two control muxes 402 and 404 is set to a low logic level, the boundary scan cell 422 can capture the state of the PUF circuitry. Doing so allows some embodiments of the invention to extract the PUF signature without adding additional circuitry as the boundary scan chain is used in FPGAs for debugging, and it can monitor data from an integrated circuit line. Alternatively, the output of the inverter may be connected to a random access memory (RAM), thereby storing the output of PUF to the RAM. When the select input of the two control muxes 402 and 404 is set to a high logic level, then the circuit functions normally, thereby causing the output of exemplary OR gate 412 to be delivered to exemplary AND gate 410 via inverter 408.

For signature generation in an LUT implementation, the system may comprise the following components:
1. LUTS mapped to a memory cell design.
2. MUX for switching between functional and PUF mode.
3. Method for extraction, such as scan chain or memory storage.

As an exemplary embodiment, a bi-stable memory cell may be mapped to an FPGA's LUT. The modeled cells, which have a random value on start-up, may be scattered throughout the design and can be read to generate a digital fingerprint for that board. Each memory cell may be connected to a MUX, which allows for switching between functional and PUF modes. The signature can then be captured or extracted in different ways, for instance, using onboard memory or scan chain architecture.

The bi-stable memory cell may be mapped to a set of LUTs in a manner that allows one to capture an initial unknown start-up value. Preserving this signal may be accomplished by using the attribute keep in VHDL. On power-up, the values produced by the LUT pairs are unknown. The intrinsic variations due to manufacturing are what determine what value is set for the LUT pairs. So certain pairs will tend to power up to a logic 1 or 0. By choosing a fixed set of LUTs to sample, a unique signature that returns the same value can then be retrieved.

In various embodiments, the memory cell design, combined with the MUX, at most takes a total of 3 LUTs per bit. A 64-bit signature would take at most 192 LUT allowing embodiments of the invention to generate a signature with very little overhead.

Figure 5:
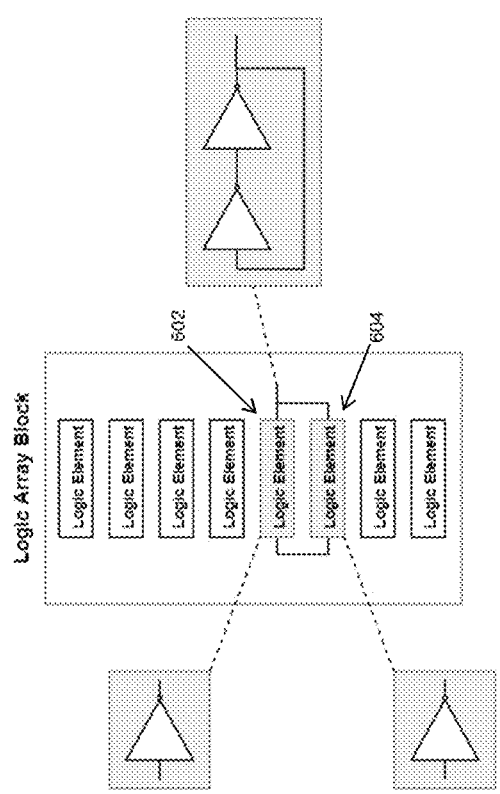
FIG. 5 is an exemplary mapping of an exemplary inverter memory cell to an exemplary logic array block, in accordance with some embodiments of the present disclosure.

FIG. 5 depicts an exemplary mapping of an exemplary inverter memory cell to LEs and their connections. As illustrated, the output of the first LE 602 is connected to the input of the second LE 604, and the output of the second LE 604 is connected to the input of the first LE 602.

Figure 6:
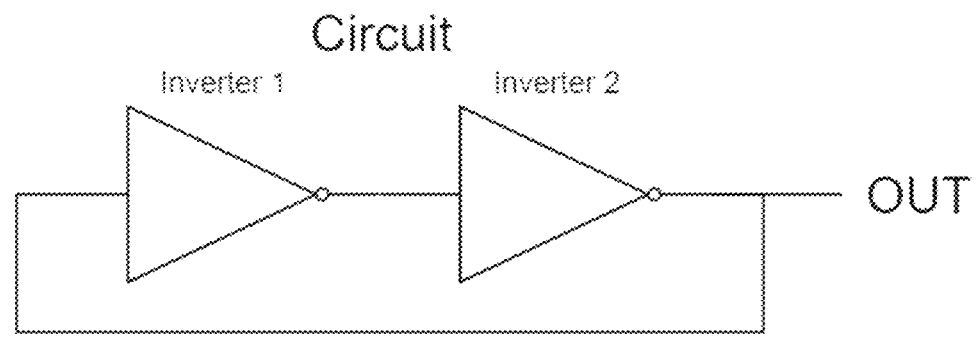
FIG. 6 is an exemplary mapping of an exemplary bi-stable memory cell to LUTs, in accordance with some embodiments of the present disclosure.
Figure 6:
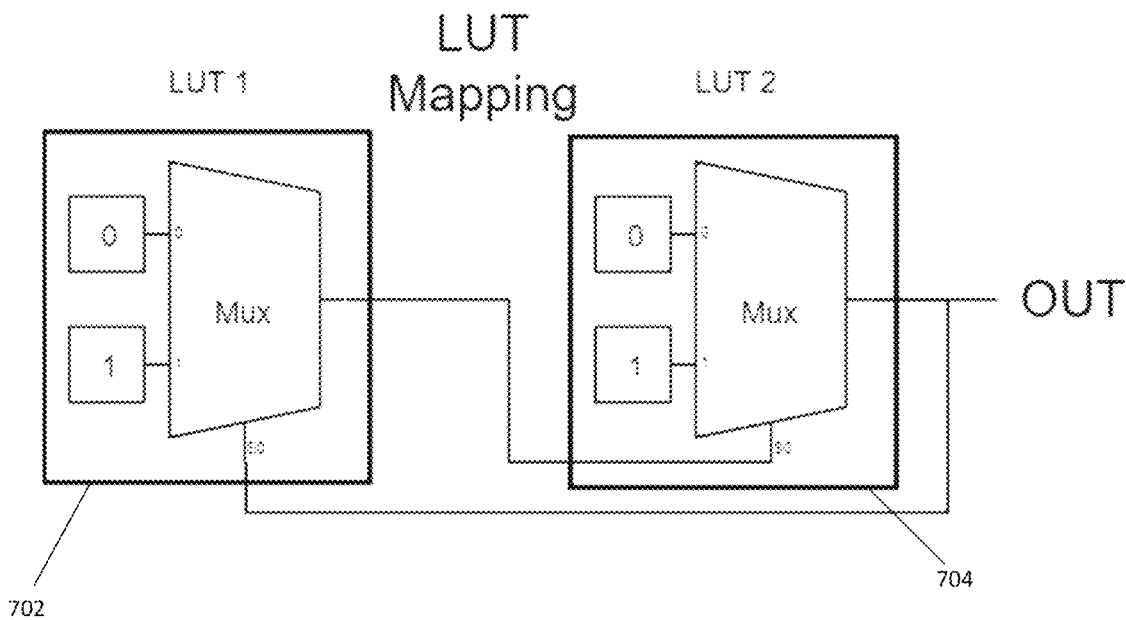

FIG. 6 illustrates an exemplary mapping of an exemplary bi-stable memory cell to LUTs. Inverter 1 may be mapped to LUT 1, and inverter 2 may be mapped to LUT 2. Each LE, in this case, would include a LUT with a single control input. In this example mapping, LUT 1 comprises mux 702, and LUT 2 comprises mux 704. The output of the LUT 1 (or the output of mux 702) is connected to the control input of the LUT 2 (or the select input of mux 704). The output of the LUT 2 (or the output of mux 704) is connected to the control input of the LUT 1 (or the select input of mux 702). When set to uninitialized, the power-up values of the control inputs of LUT 1 and LUT 2 (or the select inputs of muxes 702 and 704) determine the output value of the inverter memory cell (i.e., the output of mux 704). For example, if the power-up value of the select input of mux 704 is a logic 0, the input "0" of mux 704 is selected, causing a logic 0 to be coupled to the output of mux 704. The output of mux 704, which is a logic 0, is connected to the select input of mux 702, causing input "0" of mux 702 to be selected and coupled to the output of mux 702, which is also a logic 0. This causes the output of the inverter memory cell to settle to a logic value 0.

For the 64-bit signature, as an example, 64 such inverter memory cells may be mapped to a plurality of LUTs. When the corresponding FPGA board is powered up, each of these 64 memory cells will contain an unknown value if left uninitialized. These 64 unknown values can be concatenated to form the 64-bit signature.

Figure 7:
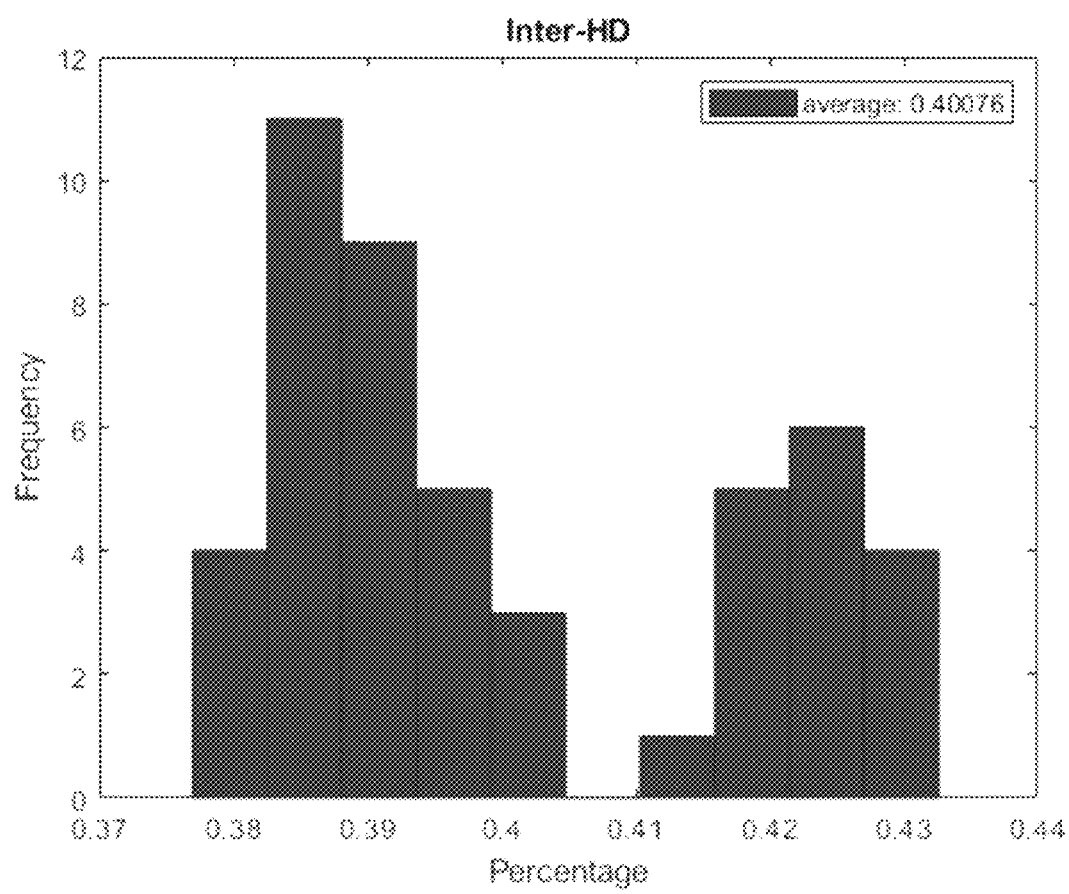
FIG. 7 is an exemplary measurement of the inter hamming distance of an exemplary generated signature.
Figure 8:
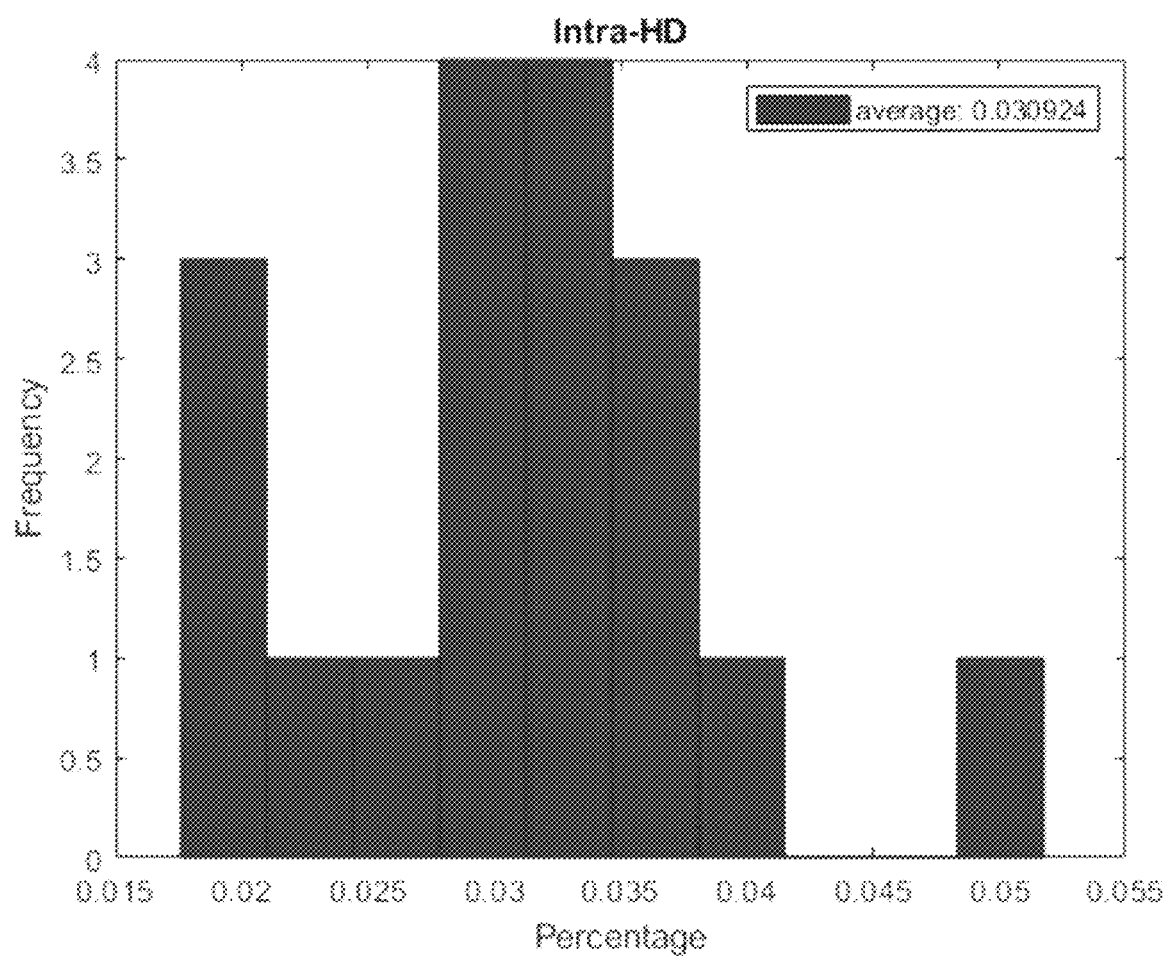
FIG. 8 is an exemplary measurement of the intra hamming distance of an exemplary generated signature.

The inter and intra hamming distance was calculated to determine if the generated signature is a suitable unique identifier. Ideally, the generated signature should have a normalized inter hamming distance of 50% and a normalized intra hamming distance of 0%. When the cells were mapped with no set locations, the measurements of the inter and intra hamming distance are shown in FIGS. 7 and 8, respectively.

Figure 9:
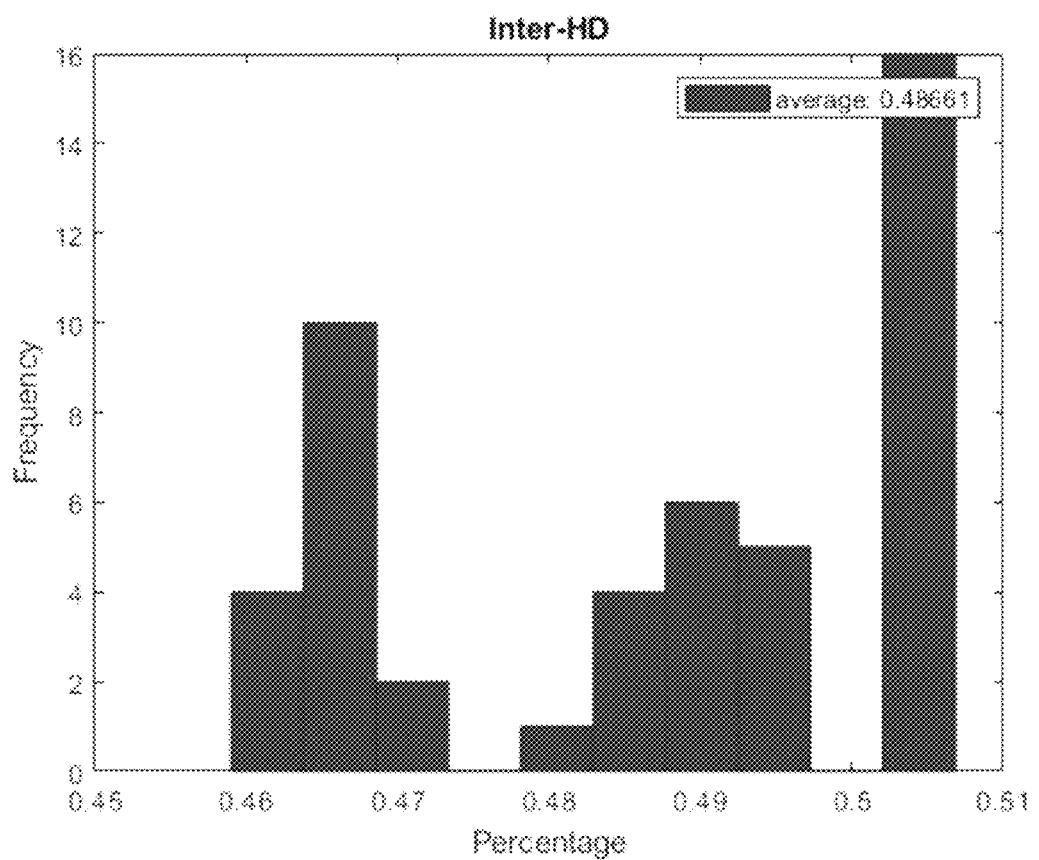
FIG. 9 is an exemplary measurement of the inter hamming distance of an exemplary generated signature with improved performance.
Figure 10:
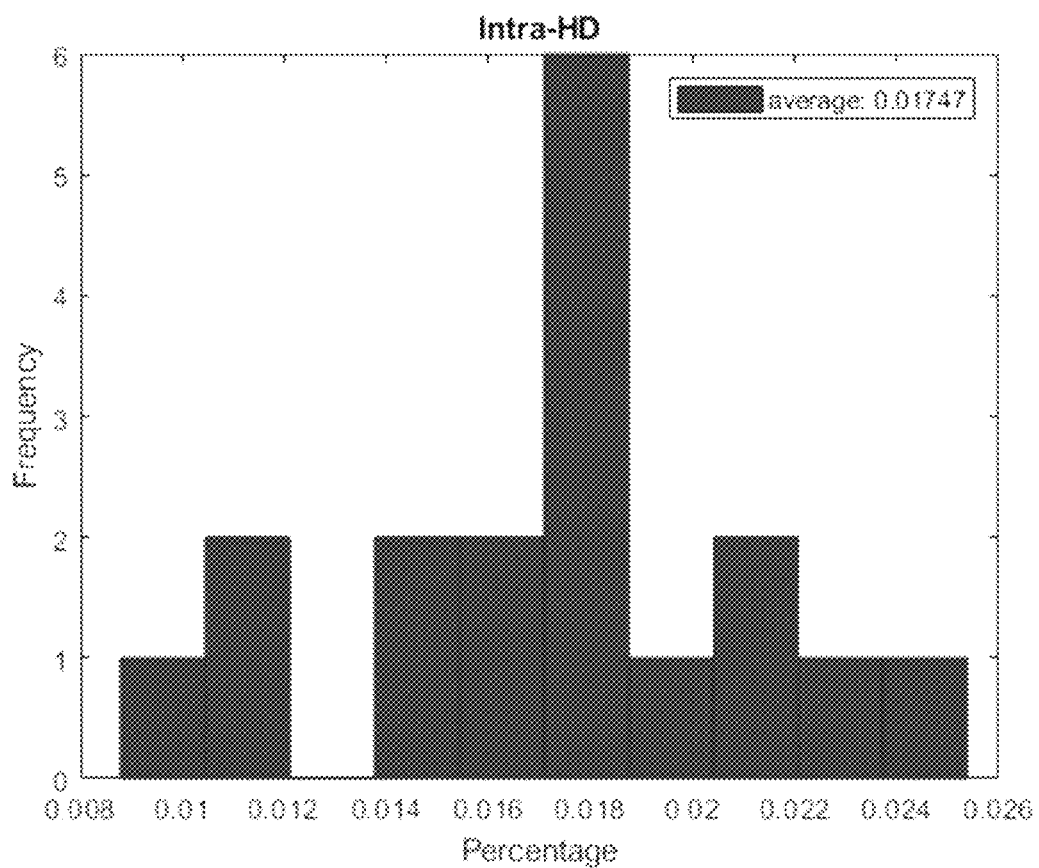
FIG. 10 is an exemplary measurement of the intra hamming distance of an exemplary generated signature with improved performance.
Figure 11:
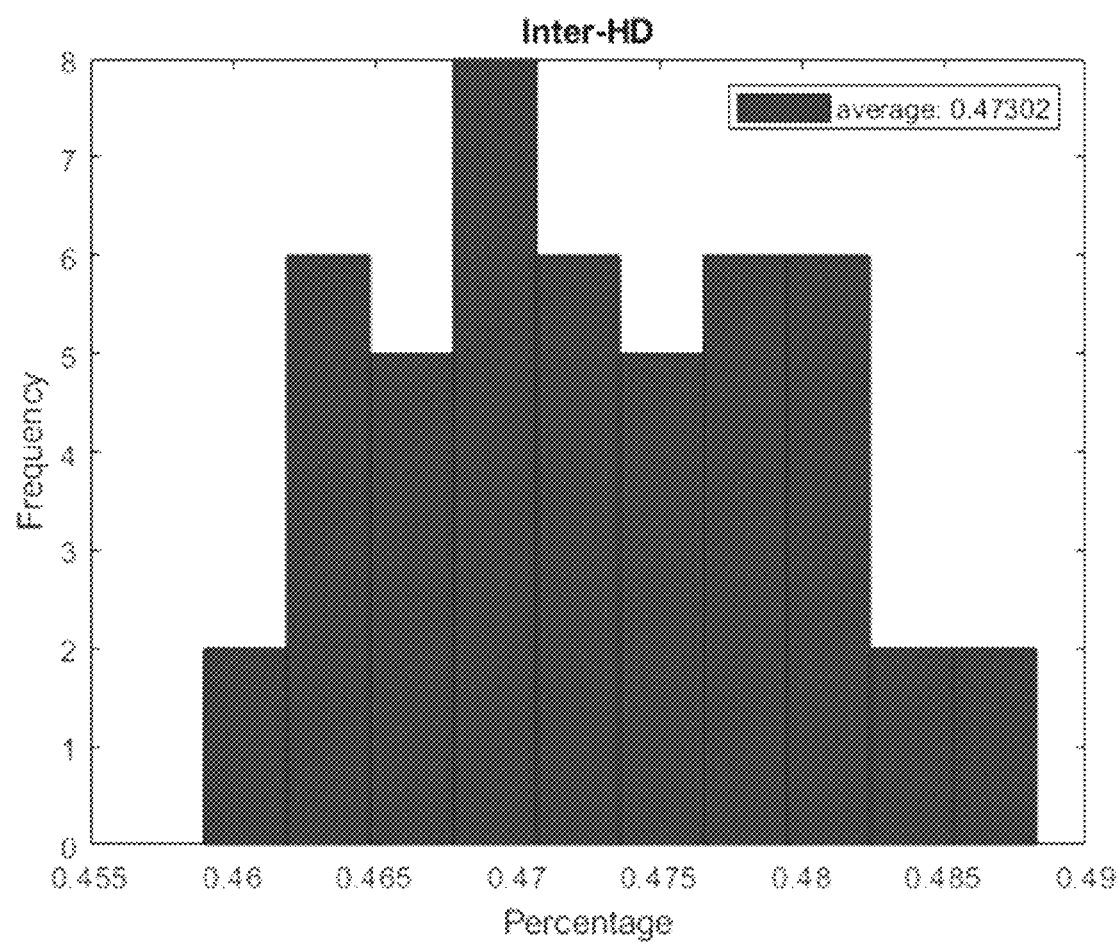
FIG. 11 is an exemplary measurement of the inter hamming distance of an exemplary signature generated in accordance with MeL PUF implementation illustrated in FIG. 4.
Figure 12:
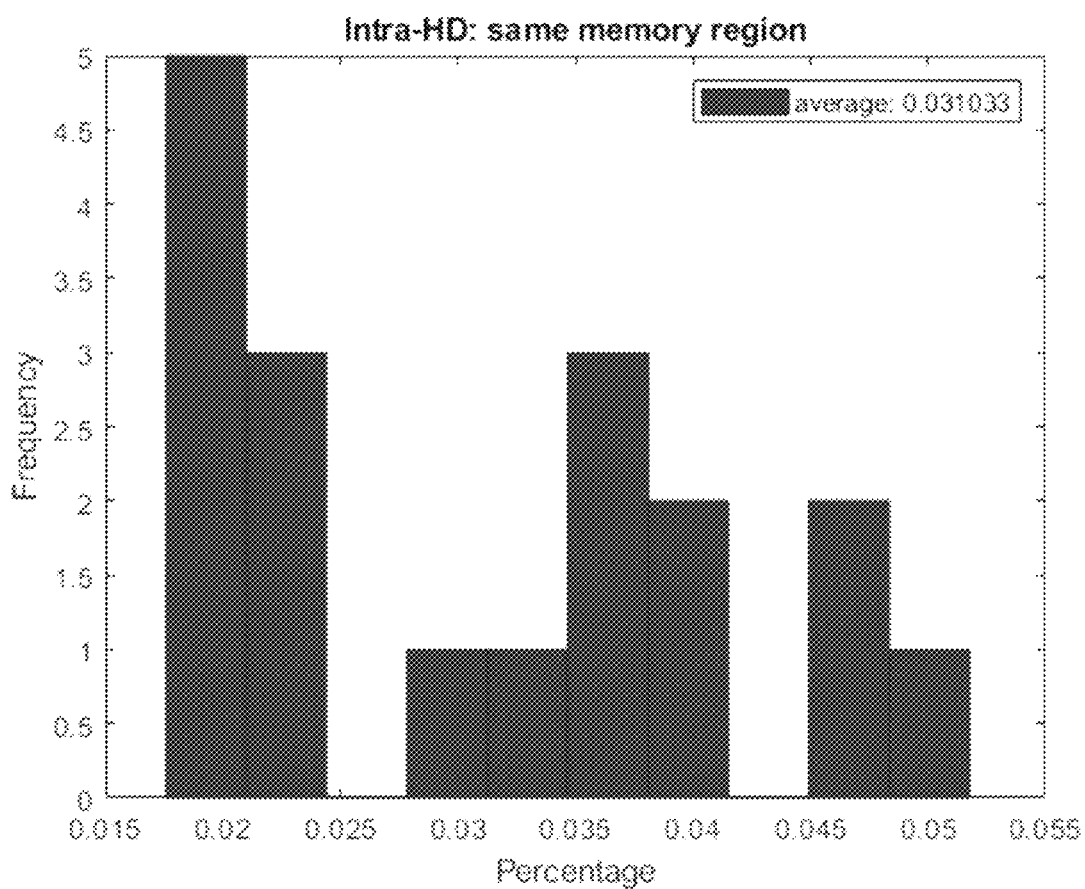
FIG. 12 is an exemplary measurement of the intra hamming distance of an exemplary signature generated in accordance with MeL PUF implementation illustrated in FIG. 4.

While intra hamming distance shows promising results, the inter hamming distance is less than ideal. These results are due to some cells on a board having a bias towards 1 or 0, or switching between the two. To improve results, multiple measurements were compiled across a range of LUT coordinates. Signatures were then compared to determine which LUT coordinates produced a bit that was different between boards, but remains the same when compared to oneself. These coordinates were then used to map memory cells to those LUTs for generating signature. Results improved significantly for the inter hamming distance, as shown in FIG. 9 and FIG. 11. The corresponding results of intra hamming distance are still promising, as shown in FIG. 10 and FIG. 12.

Results were also collected using the method shown in FIG. 4. This circuit has different data paths and sources of delay due to the two MUXs between the inverters. As a result, a different signature was generated even though the PUF was mapped to the same LUTs. The signatures were compared with each other, along with those collected above. Results were similar to those shown in the improved results, as shown in FIG. 9 and FIG. 11.

Voltage variations were also taken into account. In this case, the typical voltage supplied to the board is 3.3V. The supplied voltages were adjusted between 3V-1.97V and compared the signature to those of 3.3V. The average inter HD between voltages was recorded as 7% and the intra HD as 2%, showing that while there is some difference due to voltage variations, it is not significant. Significant changes only began to occur at 2.2V when the inter HD rose to 4%, with the highest being 10% at 1.97V, the lowest the board could function at.

For area and power overhead evaluation, the example circuit in FIG. 2 was mapped to an FPGA, both with and without the bi-stable memory circuit, to compare the area and power overheads. The Q output was then connected to a shift register, which collected results from the adder and PUF circuit and stored it in the board's RAM. Doing so allows embodiments of the invention to see functional and PUF data. This circuit was configured to collect 1024 bits of data from the adders and PUF circuits. Results were collected through the Quartus design analysis tools.

In terms of area, with the bi-stable circuit, the total LEs used was 3,362/49,760(7%). Without the PUF, the total LEs used was 548/49,760(1%). Taking into account the size of the signature being generated, this is an acceptable area overhead. At most, it would take 3 LEs to generate 1 bit of the signature. This would give a maximum area of 3072 LEs, indicating that the PUF circuit is being simplified during compilation and is under the estimated area. In terms of power overhead, there was no significant increase. The total power dissipation was 251.26 mW when the bi-stable circuit was not included. The power consumption rose to 251.39 mW when included.

As indicated above, one example implementation of a PUF on an FPGA is a boundary-scan cell implementation. A boundary-scan cell implementation relies on scan chain signature generation. In a boundary-scan cell structure, the cells that make up the boundary scan chain are all embedded with either a memory cell or flip flop for the storage of data. These elements also contain a random value on power-up. Through a minimal modification to the TAP controller, these elements could be taken advantage of to generate a signature. By taking advantage of architecture that would already be present on a board, this adds very little overhead.

Figure 13:
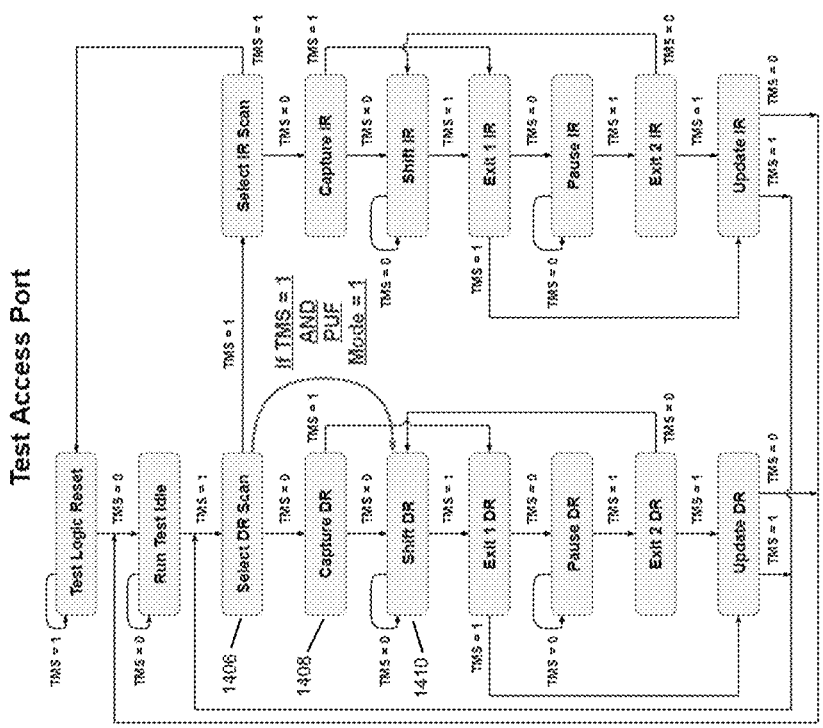
FIG. 13 is an exemplary modification to a Test Access Port (TAP) controller state machine, in accordance with some embodiments of the present disclosure.

FIG. 13 shows an exemplary modification to a TAP controller state machine that can be used to generate a scan chain signature. When the TAP controller is in the Select DR Scan state 1406, it will bypass the capture DR state 1408 and go to the shift DR state 1410 instead if both the Test Mode Select (TMS) and the PUF mode are active (or are high). This allows the values in the storage elements on power-up to be extracted.

If the capture DR state is entered, a clock DR signal is pulsed. As shown in FIG. 3, a clock DR signal would cause the capture register to sample the data present on parallel in. By bypassing the capture DR state, the initial state was prevented from being overwritten. Instead, a shift DR state is entered, which applies a clock DR signal but samples from shift in. Values are then read from the previous cell and can then be shifted and readout through the TDO pin.

Figure 14:
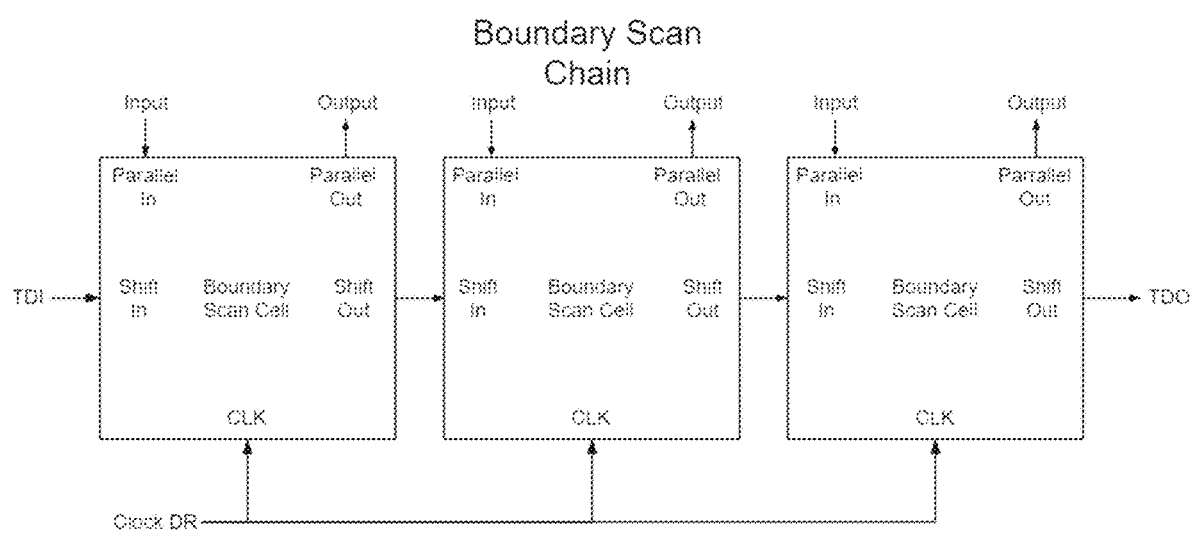
FIG. 14 is a simplified view of an exemplary connection between the capture registers on different boundary scan cells.

FIG. 14 depicts a simplified view of an exemplary connection between the capture registers on different boundary scan cells. This figure shows the connection between the registers in a cell and how their values would flow between them. When the PUF mode is enabled, instead of taking input present on Parallel In, each capture register in a boundary scan cell of a boundary scan chain reads its start-up value at its "shift out" output if left uninitialized. The start-up values of all capture registers in the boundary scan chain can be serially shifted and readout via the TDO pin to form a unique signature. The small modification to the TAP controller would constitute additional area overhead. The only constraint is the signature length, which is dependent on the length of the scan chain.

Systematic Authentication of IP Blocks

The IP blocks that MeL PUF is implemented on can be incorporated into a larger system comprised of multiple IP blocks. As such, implementing MeL PUF on multiple components of an SoC would allow embodiments of the invention to:
1. Provide unique unclonable fingerprint for each IP component in a SoC.
2. Concatenate individual IP component fingerprint into one larger SoC signature.

The IPs (Intellectual Property) that MeL PUF is implemented on can be incorporated into a more extensive system comprised of multiple IPs. Thus, implementing MeL-PUF on multiple components of an SoC would allow us to provide a unique unclonable fingerprint for each IP in that particular SoC. By taking the individual signatures for each IP, we can concatenate individual IP fingerprint into a unified SoC signature.

Figure 15:
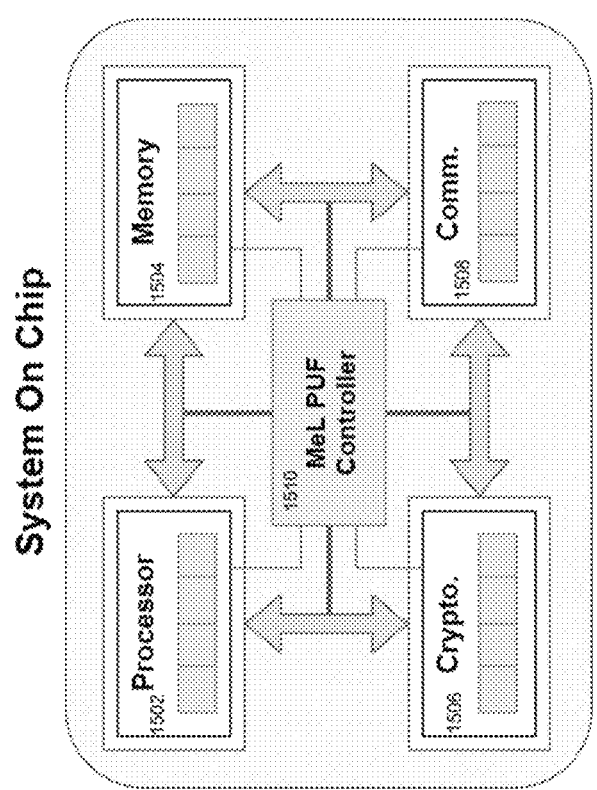
FIG. 15 is an exemplary use case of MeL PUF on an exemplary SoC, in accordance with some embodiments of the present disclosure.

FIG. 15 shows an exemplary use case of MeL PUF on an exemplary SoC. The SoC contains multiple IP components 1502, 1504, 1506, 1508 that are integrated using the IEEE 1500, highlighted in red. The IEEE 1500 is a standard for SoC test architecture, and in this case integrates the IP JTAG chains on an SoC. By implementing a MeL PUF controller 1510 to interface with the IEEE 1500 wrappers, embodiments of the invention can extract the signature for each individual IP block. Doing so allows these embodiments of the invention to authenticate each individual IP component. The individual IP signatures can then be concatenated into one signature representing the SoC as a whole. This approach ensures that the SoC signature represents each individual IP component. If an issue arises in an IP block, such as tampering, that would cause it's authentication signature to fail and the individual IP can be identified and addressed as needed.

LUT Implementation

When utilizing the LUT as a source of entropy, one appropriate use case is when using an FPGA. This FPGA should use SRAM based LUTs to function properly. By modeling a circuit using an HDL language, such as VHDL, that would allow one to capture and preserve the start-up value of the LUTs. As an exemplary embodiment, a bi-stable memory cell is shown in FIG. 3. This circuit can then be connected to a MUX and embedded in a circuit. The MUX can then be used to switch between the PUF and functional output by using its Control signal. While this solution is relatively simple, it allows for a highly configurable PUF with minimal design overhead. Signature extraction can then be done in multiple ways, depending on the designer's needs. For example, one could save the signature to RAM, or pass it through a boundary scan chain. For the LUT implementation, the PUF can be programmed on to the FPGA. Alternatively, the PUF can be embedded through a circuit design.

Scan Chain Implementation

This implementation is suited to any circuit using scan chain architecture. For example, one uses a scan chain whose length is at least 128, which ensures a proper signature length. As long as one can modify the TAP state machine, this implementation is possible. For example, one could dedicate a pin to signal the use of PUF function mode. When this pin is high, the TAP state machine will skip capture DR and go to shift DR. The start-up values of the scan chain registers can then be shifted out and read on the TDO line.

Various embodiments of the disclosure represent the first known instance of a synthesizable PUF, allowing embodiments of the invention to do constrained synthesis of a PUF into combinational logic. Various methods of the disclosure utilize the unknown states of the programmable elements to generate a signature. Doing so allows for a highly modifiable and modular PUF while utilizing minimal amounts of programmable elements. Various methods of the disclosure also allow one to switch between functional and PUF outputs and extract signatures using boundary-scan architecture or in system memory. Compared to RO PUFs and previous works implements on FPGAs, various embodiments of the disclosure take up a fraction of the space. Such improvements are due to the use of the LUT's power-up states. As such, embodiments of the invention only need to sample the two LUTs used to generate a single bit for the signature. Some of the existing delay-based PUFs require multiple LUTs to generate a delay that can be used to determine a single bit value. The low area overhead makes it highly desirable for designs with tight area or speed constraints. Due to its small nature, it is also able to be spread out through the board, making it more flexible for use in various designs and being easily inserted into existing systems. Additionally, due to its use of common FPGA elements, various embodiments of the disclosure can be implemented on a wide variety of boards from different manufacturers.

Various embodiments of the disclosure also make use of architecture already present on boards for the boundary-scan cell implementation. These embodiments use the boundary scan chain, which places cells throughout a board for debugging. By utilizing the power-up states on these cells, these embodiments of the invention can turn the scan chain into a PUF. To do this, these embodiments of the invention must make a slight modification to its control logic in the TAP controller. This modification skips a step that would overwrite the cell's startup values. Therefore, these values can be preserved and used as a source of entropy. As a boundary scan chain is present in a large variety of boards, it offers the possibility of implementation on a variety of existing platforms with negligible overhead costs.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. A method of generating a signature using an FPGA, the method comprising:
programming the FPGA to form N back-to-back inverters each comprising a first inverter and a second inverter, wherein each of the back-to-back inverters is enabled to settle to a voltage level, representative of either a high logic level or a low logic level, during a power-up phase and without being driven by logic elements disposed in the FPGA, and wherein programming the FPGA to form each of the N back-to-back inverters comprises:
programming the FPGA to form the first inverter of each of the N back-to-back inverters by mapping the first inverter to a first look up table (LUT), wherein the first LUT comprises a first multiplexer,
programming the FPGA to form the second inverter of each of the N back-to-back inverters by mapping the second inverter to a second LUT, wherein the second LUT comprises a second multiplexer, and
programming the FPGA to couple an output of the first multiplexer to a select input of the second multiplexer and to couple an output of the second multiplexer to a select input of the first multiplexer; and
combining the N logic levels to generate the signature.

2. The method of claim 1 further comprising:
programming the FPGA to form first and second groups of N multiplexers, wherein each multiplexer in the first group is associated with and disposed between an output of the first inverter and an input of the second inverter of a different one of the N back-to-back inverters, wherein each multiplexer in the second group is associated with and disposed between an output of the second inverter and an input of the first inverter of a different one of the N back-to-back inverters, and wherein in response to a first value of a select signal, a loop is formed between each back-to-back inverter and its associated multiplexers in the first and second groups.

3. The method of claim 2 wherein in response to a second value of the select signal, a logic signal generated by a first logic element disposed in the FPGA is delivered by the first inverter to a second logic element disposed in the FPGA.

4. The method of claim 1 further comprising:
programming the FPGA to store an output of each of the back-to-back inverters in a latch during the power-up phase.

5. The method of claim 1, further comprising:
programming the FPGA to extract an output of each of the back-to-back inverters via a boundary scan cell in a boundary scan chain during the power-up phase.

6. A programmable device comprising:
N back-to-back inverters each comprising a first inverter and a second inverter, wherein each of the back-to-back inverters is configured to settle to a voltage level, representative of either a high logic level or a low logic level, during a power-up phase and without being driven by logic elements disposed in the programmable device, wherein the first inverter of each of the N back-to-back inverters comprises a first look up table (LUT), wherein the first LUT comprises a first multiplexer, wherein the second inverter of each of the N back-to-back inverters comprises a second LUT, wherein the second LUT comprises a second multiplexer, and wherein the first and second LUTs are configured to couple an output of the first multiplexer to a select input of the second multiplexer and to couple an output of the second multiplexer to a select input of the first multiplexer; and
circuitry configured to combine the N logic levels to generate a signature.

7. The programmable device of claim 6 further comprising:
first and second groups of N multiplexers, wherein each multiplexer in the first group is associated with and disposed between an output of the first inverter and an input of the second inverter of a different one of the N back-to-back inverters, and wherein each multiplexer in the second group is associated with and disposed between an output of the second inverter and an input of the first inverter of a different one of the N back-to-back inverters, and wherein the programmable device is configured to, in response to a first value of a select signal, form a loop between each back-to-back inverter and its associated multiplexers in the first and second groups.

8. The programmable device of claim 7 is further configured to, in response to a second value of the select signal, deliver a logic signal generated by a first logic element disposed in the device to a second logic element disposed in the device via the first inverter.

9. The programmable device of claim 6 further comprising:
N latches each configured to store an output of a different one of the N back-to-back inverters during the power-up phase.

10. The programmable device of claim 6 further comprising:
N boundary scan cells in a boundary scan chain each configured to extract an output of a different one of the N back-to-back inverters during the power-up phase.

11. A system comprising:
a plurality of programmable devices, each of the plurality of programmable devices comprising:
N back-to-back inverters each comprising a first inverter and a second inverter, wherein each of the back-to-back inverters is configured to settle to a voltage level, representative of either a high logic level or a low logic level, during a power-up phase and without being driven by logic elements disposed in the programmable device, wherein the first inverter of each of the N back-to-back inverters comprises a first look up table (LUT), wherein the first LUT comprises a first multiplexer, wherein the second inverter of each of the N back-to-back inverters comprises a second LUT, wherein the second LUT comprises a second multiplexer, and wherein the first and second LUTs are configured to couple an output of the first multiplexer to a select input of the second multiplexer and to couple an output of the second multiplexer to a select input of the first multiplexer, and
circuitry configured to combine the N logic levels to generate a signature; and
a circuit block configured to combine the signatures of the plurality of programmable devices to generate a system signature.

12. A method of generating a signature using an FPGA, the method comprising:
enabling an output of each of a first group of N registers to settle to a voltage level, representative of either a high logic level or a low logic level, during a power-up phase and without applying a clock signal to the registers; and combining the N logic levels to generate the signature.

13. The method of claim 12 further comprising:

storing the output of each of the first group of N registers in a different one of a second group of N registers.

14. The method of claim 12 wherein each of the registers in the first group is coupled to another one of N registers of a second group via a different one of a plurality of multiplexers.

15. A programmable device comprising:

a first group of N registers each configured to settle to a voltage level, representative of either a high logic level or a low logic level, during a power-up phase and without receiving a clock signal; and a logic block configured to combine the N logic levels to generate a signature.

16. The programmable device of claim 15 further comprising:

a second group of N registers, wherein each register in the second group is configured to store the output of a different one of the N registers of the first group.

17. The programmable device of claim 16 further comprising:

a plurality of multiplexers, wherein each of the registers in the first group is configured to couple to another one of the N registers in the second group via a different one of the plurality of multiplexers.

18. A system comprising:

a plurality of programmable devices, each of the plurality of programmable devices comprising:

a first group of N registers each configured to settle to a voltage level, representative of either a high logic level or a low logic level, during a power-up phase and without receiving a clock signal, and a logic block configured to combine the N logic levels to generate a signature; and a circuit block configured to combine the signatures of the plurality of programmable devices to generate a system signature.

* * * * *